United States Patent
Thomas et al.

(10) Patent No.: US 12,324,425 B2
(45) Date of Patent: Jun. 10, 2025

(54) ROD CARRIER

(71) Applicant: RiverSmith Inc., Boulder, CO (US)

(72) Inventors: Jason Thomas, Denver, CO (US); John McGowan, Boulder, CO (US)

(73) Assignee: RiverSmith Inc., Boulder, CO (US)

( * ) Notice: Subject to any disclaimer, the term of this patent is extended or adjusted under 35 U.S.C. 154(b) by 58 days.

(21) Appl. No.: 18/349,598

(22) Filed: Jul. 10, 2023

(65) Prior Publication Data
US 2024/0008468 A1    Jan. 11, 2024

Related U.S. Application Data

(60) Provisional application No. 63/368,132, filed on Jul. 11, 2022.

(51) Int. Cl.
A01K 97/10    (2006.01)

(52) U.S. Cl.
CPC .................................. A01K 97/10 (2013.01)

(58) Field of Classification Search
CPC ........ A01K 97/10; A01K 97/08; B63B 7/085; B63B 34/05; B63B 35/14
USPC ........... 43/21.1, 26; 114/255, 364, 343, 345, 114/347; 211/70.8; 224/922, 400, 406, 224/42.11, 545–548, 550, 555, 556; 206/315.11, 315.1, 315.12; 220/324
See application file for complete search history.

(56) References Cited

U.S. PATENT DOCUMENTS

| | | | | |
|---|---|---|---|---|
| 4,209,098 A | * | 6/1980 | Adams | A47F 5/0853 248/513 |
| 5,293,711 A | * | 3/1994 | Robinson | A01K 97/08 206/315.11 |
| 5,586,515 A | * | 12/1996 | Nickles | A01K 97/08 114/343 |
| 2002/0002791 A1 | * | 1/2002 | Thompson | A01K 97/08 43/21.2 |
| 2018/0070573 A1 | * | 3/2018 | Harris | A01K 97/10 |
| 2019/0223424 A1 | * | 7/2019 | Moses | A47F 7/0035 |
| 2019/0230911 A1 | * | 8/2019 | Smigaj | B60R 9/08 |
| 2022/0314894 A1 | * | 10/2022 | Viklund | A01K 97/10 |

OTHER PUBLICATIONS

Down River website, Down River Fishing Rod Holder for Catacraft, online: https://www.downriverequip.com/framtes/frame-additions/fishing-cid-166, obtained on Jun. 15, 2022, 4 pages.
Montana Raft Frames website, Rod Dog Rod Holder, online: http://www.montanaraftframes.com/rod-dog, obtained Jun. 15, 2022, 2 pages.
Rod Bunker website, The Guide—4 Rod Holder, online: https://www.therodbunker.com/product-page/the-guide-4-rod-holder, obtained Jun. 15, 2022, 2 pages.

* cited by examiner

*Primary Examiner* — Joshua J Michener
*Assistant Examiner* — Nicole Paige Maccrate
(74) *Attorney, Agent, or Firm* — Merchant & Gould P.C.

(57) ABSTRACT

A rod carrier includes a main body elongated along a longitudinal axis and having a U-shaped cross-sectional profile. A reel box is coupled to one end of the main body and a nose cone is coupled to an opposite end. One or more tube members are coupled to the nose cone. At least one of the one or more tube members being curved relative to the longitudinal axis or flexible.

19 Claims, 15 Drawing Sheets

ROD CARRIER

CROSS-REFERENCE TO RELATED APPLICATIONS

This application claims the benefit of priority to U.S. Provisional Application No. 63/368,132, filed Jul. 11, 2022, which application is hereby incorporated in its entirety by reference.

INTRODUCTION

Fishing rods are typically long, thin poles that are used by anglers to catch fish. At its most basic form, a fishing rod is a long pole with a line stored in a reel mounted at a rod handle. The length of the fishing rod can vary depending on the style of angling, but usually varies between 2 feet and 15 feet long. Because of the length of the fishing rod, transportation can be difficult.

Angler's often use boats to navigate a river or other body of water for angling. For example, some angler's are known to use an inflatable raft to navigate a river and carry one or more fishing rods. Known inflatable rafts are typically formed from nylon or Kevlar infused plastics like PVC or urethane, and can have external frames that support oars for propulsion. Transporting fishing rods on an inflatable raft can be difficult while providing protection to the rod from branches, rocks, and other river obstacles, providing ease of access to the rod, and not restricting operation of the inflatable raft like oar position and location.

Rod Carrier

This disclosure describes improved rod carriers for fly fishing rods. The rod carrier may be mounted on a raft or other boat and/or vehicle for transporting and protecting the fly fishing rod. The rod carrier is easily and adjustably mounted to a frame of the raft so that the rod carrier can accommodate many different frame configurations. Additionally, multiple rod carriers are able to be mounted side-by-side from one another. The rod carrier enables the fly fishing rod to be easily inserted into and removed from the rod carrier. The fly fishing rod is also secured within the rod carrier even with a portion of the rod carrier having an open top configuration. Portions of the rod carrier may be curved and/or rotatable such that the rod carrier can contour to the shape of the raft.

In one aspect, the technology relates to a rod carrier including: a main body having a first body end and an opposite second body end elongated along a longitudinal axis, the main body having a U-shaped cross-sectional profile with first and second side walls and a bottom wall, an inner surface of the first and second side walls includes a protrusion spaced apart from the bottom wall and extending between the first body end and the second body end; a reel box coupled to the first body end of the main body; a nose cone coupled to the second body end of the main body, the nose cone having a first nose end and an opposite second nose end, the nose cone defining an internal passageway extending along the longitudinal axis, the first nose end corresponding in shape to the second body end of the main body including corresponding protrusions, the second nose end having a smaller shape than the first nose end; and one or more tube members coupled to the second nose end, at least one of the one or more tube members being curved relative to the longitudinal axis or flexible.

In an example, the main body has an outer surface, and one or more T-shaped channels are defined within the outer surface and extending between the first body end and the second body end. In another example, the reel box includes an outer perimeter wall at a distal end of the reel box and a shelf disposed substantially orthogonal to the outer perimeter wall, an upper volume of the reel box is defined above the shelf and a lower volume of the reel box is defined below the shelf, the shelf having an opening such that the lower volume is in communication with the upper volume. In still another example, the shelf includes a ridge extending between the opening and the outer perimeter wall. In yet another example, the at least one of the one or more tube members is curved with a radius of about three feet. In an example, the one or more tube members include a first tube member having a straight configuration and a second tube member having the curved configuration, the first tube member coupled to the second tube member.

In another example, the first tube member is coupled to the second tube member via a C-clip such that longitudinal movement is restricted and rotational movement around the longitudinal axis is allowed. In still another example, the one or more tube members are rotatable around the longitudinal axis when coupled to the second nose end of the nose cone.

In another aspect, the technology relates to a rod carrier including: a main body having a first body end and an opposite second body end elongated along a longitudinal axis, the main body having a U-shaped cross-sectional profile with first and second side walls and a bottom wall; a reel box coupled to the first body end of the main body; a nose cone coupled to the second body end of the main body, the nose cone having a first nose end and an opposite second nose end, the nose cone defining an internal passageway extending along the longitudinal axis, the first nose end corresponding in shape to the second body end of the main body, the second nose end having a substantially circular cross-sectional profile, wherein the first nose end is larger than the second nose end and an inner surface of the internal passageway tapers inwardly from the first nose end towards the second nose end; and one or more tube members coupled to the second nose end, at least one of the one or more tube members being curved relative to the longitudinal axis or flexible.

In an example, the first and second side walls of the main body include an inner protrusion spaced apart from the bottom wall and extending between the reel box and the nose cone. In another example, a plurality of T-shaped channels are defined on an outer surface of the main body and extending between the first body end and the second body end, and each of the first and second side walls and the bottom wall includes at least one T-shaped channel. In still another example, one or more frame mounts are configured to couple to the main body via at least one of the plurality of T-shaped channels. In yet another example, the second nose end of the nose cone includes an outer annular recess, the one or more tube members coupled to the second nose end via a C-clip engaging with the outer annular recess such that longitudinal movement is restricted and rotational movement around the longitudinal axis is allowed. In an example, a cap is coupled to a distal end of the one or more tube members.

In another example, the reel box defines an upper volume configured to receive a reel of a fly rod and a lower volume configured to receive at least a portion of a handle of the fly rod, the upper volume at least partially separated from the lower volume by a shelf.

In another aspect, the technology relates to a rod carrier assembly including: one or more extrusions couplable together to form a main body, the one or more extrusions being a U-shaped cross-sectional profile with first and second side walls and a bottom wall, an inner surface of the first and second side walls including a protrusion spaced apart from the bottom wall, and each of the first and second side walls and the bottom wall includes at least one T-shaped channel; a reel box couplable to an end of the one or more extrusions; a nose cone couplable to an end of the one or more extrusions, the nose cone having a first nose end and an opposite second nose end, the nose cone defining an internal passageway, the first nose end corresponding in shape to the cross-sectional profile of the one or more extrusions, the second nose end having a substantially circular cross-sectional profile, wherein the first nose end is larger than the second nose end and an inner surface of the internal passageway tapers inwardly from the first nose end towards the second nose end; and one or more tube members couplable to the second body end of the main body.

In an example, at least one frame mount is selectively positionable within the at least one T-shaped channel and configured to secure the main body to a frame of a raft, the at least one frame mount including an extension plate. In another example, at least one strap is included for the one or more tube members. In still another example, the one or more tube members include a curved tube member and a straight tube member. In yet another example, the reel box is an open top container with a multi-level bottom surface. In an example, the reel box and the nose cone include a bracket configured to engage with the at least one T-shaped channel.

In another example, the one or more tube members include a flexible tube member.

These and various other features as well as advantages that characterize the rod carriers described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Transportation of fly fishing rods is often difficult because of their length and because of the type of terrain (e.g., a body of water such as a river) being transported over. Fly fishing rods are often transported on river rafts, and carrying the fly fishing rod should not interfere with the operation of the raft, but transportation should also provide a convenient location for accessing the fly fishing rod. The rod carrier described herein has a main body with a U-shaped cross-sectional profile. An inside surface of the main body is configured to receive and secure the fly fishing rod. An outside surface of the main body has a plurality of T-shaped channels that extend lengthwise of the main body. The T-shaped channels are configured for a frame mount so that the rod carrier can be mounted to the frame of the raft and accommodate many different frame configurations. Additionally, the T-shaped channels are used for the assembly of the rod carrier. A nose cone is disposed on one end of the main body and has one or more tube members extending therefrom. The nose cone facilitates smooth insertion of the distal end of the fly fishing rod into the tube members for storage and protection. The tube members may be curved and rotatable so that the contour of the raft can be matched. A reel box is disposed on the other end of the main body and is configured to secure and protect the reel of the fly fishing rod while still facilitating easy insertion and removal from the rod carrier.

The rod carrier is configured to hold a single fly fishing rod, however, multiple rod carriers can be mounted side-by-side to one another so that multiple fly fishing rods can be transported. The rod carriers may be positioned parallel to each other and either face the same direction or opposing directions as required or desired.

Throughout this description, references to orientation (e.g., front(ward), rear(ward), top, bottom, back, right, left, upper, lower, etc.) of the rod carrier relate to its position when installed on a raft and are used for ease of description and illustration only. No restriction is intended by use of the terms regardless of how the rod carrier is situated on its own.

Figure 1:
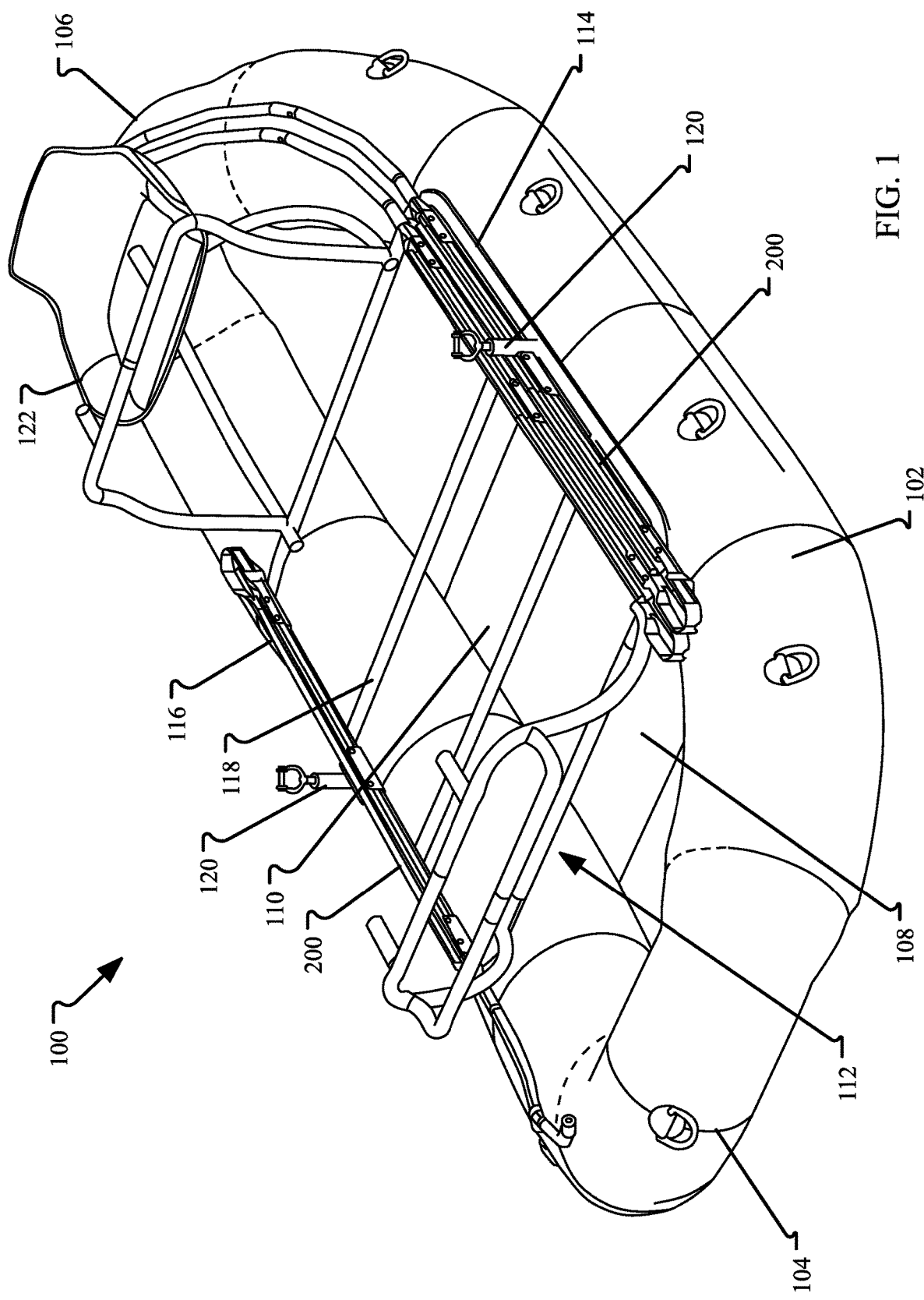
FIG. 1 is a perspective view of a raft with a plurality of exemplary rod carriers.

FIG. 1 is a perspective view of a raft 100 with a plurality of rod carriers 200. The raft 100 can include an outer tube 102 having a bow 104 and a stern 106. One or more thwarts 108 can extend between the outer tube 102 and a floor 110 is positioned below. The bow 104 and the stern 106 curve inward and rise up so that the raft 100 can float over large waves. A frame 112 can be secured to the raft 100 and so as to support oars (not shown). The frame 112 includes a port rail 114, a starboard rail 116, and one or more cross rails 118.

A pair of oar mounts 120 are secured to the frame 112, for example, at the port and starboard rails 114, 116 for supporting the oars. A captain's seat 122 can be positioned on one or more of the cross rails 118. Generally, the frame 112 can be outfitted for special activities as required or desired. Some frames 112 can include features (not shown) for fishing, like thigh bars, swivel seats, stern-mount seats, anchor systems, etc. Other frames 112 can include running boards (not shown) along the side rails to make it easier to step on and off the raft. The frame 112 can also be used to promote gear securement and/or any other raft feature as required or desired. The frame 112 is typically strapped (not shown) to the outer tube 102 of the raft 100 using the D-rings located on the outer tube 102.

In the example described herein, the frame 112 is used to support one or more rod carriers 200 and so that fishing rods can be more easily carried on the raft 100 and with increased protection and security. For example, the rod carrier 200 can be mounted proximate to the port and starboard rails 114, 116, adjacent the oar mounts 120, and attached to the cross rails 118. The rod carrier 200 can mount in either the bow or stern direction as required or desired. The rod carriers 200 can also mount side-by-side to one another. As illustrated, the rod carriers 200 that are side-by-side can be oriented in the same direction. In other examples, the side-by-side rod carriers 200 can be oriented in opposing directions as required or desired. As illustrated, the rod carriers 200 are disposed inside of the oar mounts 120. In other examples, the rod carriers 200 may be disposed outside of the oar mounts 120, for example, by attaching to the port and starboard rails 114, 116.

While an inflatable whitewater type raft 100 is described herein, it is appreciated that the rod carrier 200 described herein can be used on any type of boat or vehicle as required or desired for angling activities and which provides a rigid frame for attachment to and carrying fishing rods. Inflatable boats may include, but are not limited to inflatable kayaks, inflatable canoes, pontoon boats, float tubes, inflatable rafts (e.g., raft 100 illustrated in FIG. 1), stand up paddle boards, and the like. Inflatable boats may be manual-powered (e.g., the raft 100) or motor-powered as required or desired. Other types of boats contemplated herein include manual-powered boats or motor-powered boats like rowboats, kayaks, canoes, skiffs, j on boats, deck boats, catamarans, pontoons, cabin boats, etc. Vehicles may include four-wheelers such as all terrain vehicles, side-by-sides, and the like. In an aspect, a vehicle may be a truck, SUV, RV, passenger van, or other type of passenger car. For example, the rod carrier 200 may be mounted at least partially within a truck bed with at least a portion of the rod carrier 200 conforming to the truck bed.

Figure 2:
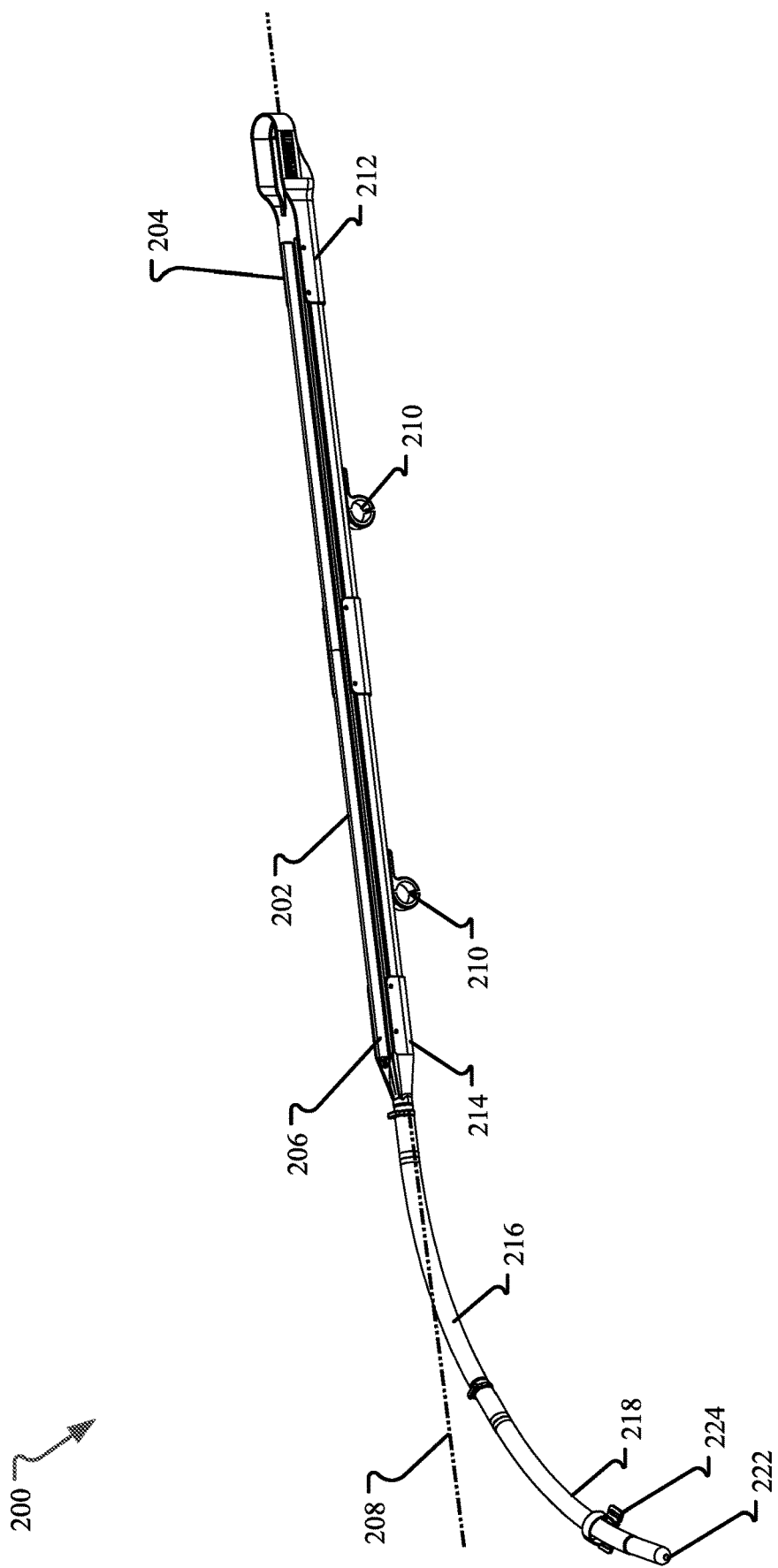
FIG. 2 is a perspective view of the rod carrier.

FIG. 2 is a perspective view of the rod carrier 200. The rod carrier 200 is configured to receive and carry a single fishing rod. Fishing rods are known to one of skill in the art and typically include a handle coupled to an elongated rod that is flexible. A reel is mounted proximate the handle and includes a line supported on the elongated rod. As used herein, the fishing rod may be considered a fly fishing rod that uses a light-weight lure and a weighted line, although other angling rod types are contemplated herein. Fly fishing rods may be between 5-12 feet for general use, however, specialized rods may have a length of 12 feet and longer as required or desired. Accordingly, fly fishing rods are difficult to transport and carry on rafts. The fly fishing rods should be protected so that undesirable wear is reduced or prevented. For example, contact with rocks and branches when traveling on the water, or users stepping in and out of the raft. Additionally, the fly fishing rods should be easily accessible and easily stored while traveling on the raft and on the water.

The rod carrier 200 described below carries a single fly fishing rod, however, multiple rod carrier 200 can be mounted together and so that multiple fly fishing rods can be carried on the raft. By supporting one fly fishing rod at a time, the rod is prevented from tangling with other rods and wear is reduced by contact from other rods, thereby increasing storage and accessibility of the fly fishing rod while on the water. In alternative examples, the components of the rod carrier 200 may be widened so that two or more fly fishing rods may be carried within a single rod carrier 200.

The rod carrier 200 is formed from an assembly of components that can be efficiently assembled together and that enable the rod carrier to be easily configurable to different size fly fishing rods and different raft frame configurations. Additionally, the modularity of components facilitates more efficient packing and shipping for the rod carrier assembly. The rod carrier 200 has a main body 202 with a first end 204 and an opposite second end 206 elongated along a longitudinal axis 208. One or more frame mounts 210 couple to the main body 202 and are selectively positionable along the longitudinal axis 208. The frame mount 210 has one end that secures to the frame 112 (shown in FIG. 1) and another end that secures to the main body 202. The frame mount 210 is described further below in FIG. 11, and can secure to the main body 202 at multiple locations so that the rod carrier 200 can mount to different frame 112 configurations. For example, if the oar mount 120 (shown in FIG. 1) extends upward from the frame 112, the rod carrier 200 can mount inside or outside of the oar mount on the frame 112. In another example, if the oar mount 120 is positioned inward on the frame 112, the rod carrier 200 can mount directly on the side of the frame 112. The frame mount 210 can mount to the side rails 114, 116 and/or the cross rails 118 (all shown in FIG. 1) as required or desired.

The main body 202 is a U-shaped channel that is open on top and so that the fly fishing rod can be easily inserted and removed from the rod carrier 200. In an aspect, the fly fishing rod is configured to be disposed entirely within the main body 202 so as to provide protection thereto.

A reel box 212 is coupled to the first end 204 of the main body 202. The reel box 212 is an open top container that is in communication with the main body 202 and sized and shaped to receive and store the reel of the fly fishing rod. A nose cone 214 is coupled to the second end 206 of the main body 202, and one or more tube members 216, 218 are coupled to the nose cone 214. The nose cone 214 defines an internal passageway 220 (shown in FIGS. 5 and 6) that enables the tube members 216, 218 to be in communication with the main body 202. The nose cone 214 and the tube members 216, 218 form a complete enclosure that receives and stores the distal end of the fly fishing rod while still allowing for the rod to be inserted and removed from the rod carrier 200. A cap 222 is coupled to a distal end of the tube members 216, 218 so as to cover the end opening. At least one strap 224 may be used to secure the tube members 216, 218 to the raft 100 as required or desired.

In the example, while the main body 202 is straight along the longitudinal axis 208, at least one of the tube members 216, 218 is curved relative to the longitudinal axis 208. The distal end of the fly fishing rod is flexible and can easily be placed in a curved configuration without damage. By curving the tube members 216, 218, the tube members 216, 218 can more easily contour to the bow or the stern of the raft 100 and reduce the rod carrier 200 from catching on branches or rocks when floating by. In other aspects, the tube members 216, 218 may contour to a truck bed if the rod carrier 200 is being mounted on a truck. Additionally, the tube members 216, 218 can be selected so as to match the length of the fly fishing rod being stored therein. The tube members 216, 218 are described further below in reference to FIGS. 9 and 10.

Figure 3:
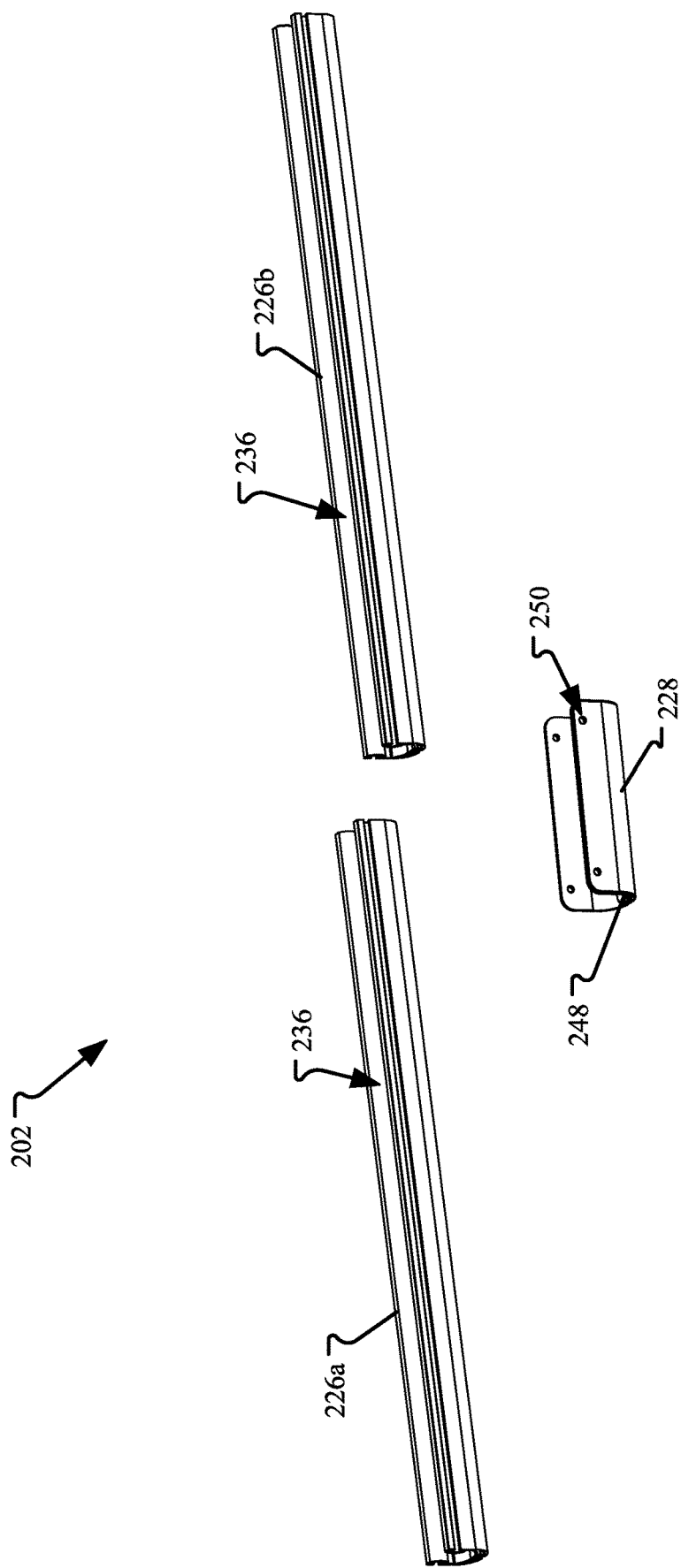
FIG. 3 is an exploded perspective view of a main body of the rod carrier.
Figure 4:
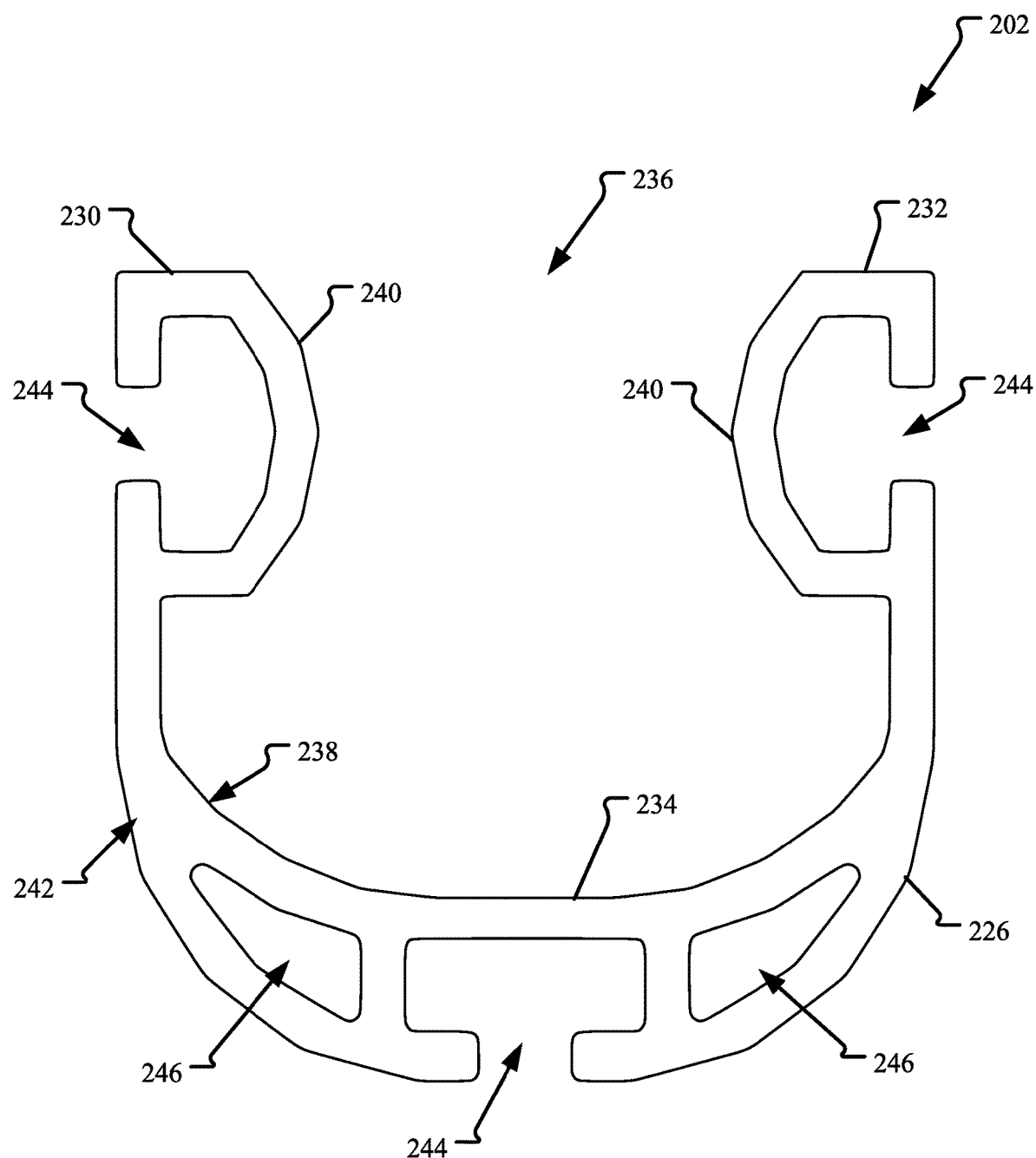
FIG. 4 is a cross-sectional profile view of the main body.

FIG. 3 is an exploded perspective view of the main body 202 of the rod carrier 200 (shown in FIG. 2). FIG. 4 is a cross-sectional profile view of the main body 202. Referring concurrently to FIGS. 3 and 4, the main body 202 may be formed from one or more extrusions 226a, 226b that are coupled together with a bracket 228. Each extrusion 226 may have a length as required or desired and allow the rod carrier 200 to be easily shipped and assembled as required or desired. In an aspect, the length may be between 12 inches and 60 inches. Each extrusion 226a, 226b may have the same or a different length as required or desired. Furthermore, by forming the main body 202 via extruded components, the main body 202 can have features (e.g., the T-shaped slots) that increase performance of the rod carrier 200. The extrusions 226 may be an extruded component or formed via folding sheet metal as required or desired. As used herein, extrusions have a constant cross-sectional profile along their entire longitudinal length.

The extrusions 226 have a substantially U-shaped cross-sectional profile with opposing first and second side walls 230, 232 connected by a bottom wall 234. As such, a top opening 236 is defined between the side walls 230, 232 so that a fly fishing rod can be placed into and removed from an inner surface 238 of the main body 202. The inner surface 238 of the extrusions 226 also include a protrusion 240 extending into the U-shaped channel and spaced apart from the bottom wall 234 at the distal end of the side walls 230, 232. The protrusion 240 extends the length of the extrusions 226. When the fly fishing rod is disposed within the main body 202, the protrusion 240 forms a blocking structure that reduces or prevents the fly fishing rod from undesirably coming out of the top opening 236 when being transported. For example, when the fly fishing rod is in a flexed positioned due to the curved tube member, the rod bends such that a portion of the rod deflects towards one of the side walls 230, 232, and thus, is positioned underneath the protrusion 240. Additionally, the protrusion 240 assists the user inserting and removing the fly fishing rod from the rod carrier 200. Typically, the user inserts the distal tip of the rod into the main body 202 first and prior to sliding the distal tip towards and into the tube member. The distal tip can catch underneath the protrusion 240 so that the user can more easily slide the distal tip into the tube member. The protrusion 240 may be formed as a bulge (as illustrated) that has an outer surface that is at least partially rounded. In other examples, the protrusion 240 may be formed as a lip, rim, or any other blocking structure as required or desired.

On an outer surface 242 of the extrusion 226, the main body 202 includes at least one T-shaped channel 244 extending the length of the extrusion 226. In the example, each wall 230, 232, 234 of the extrusion 226 includes a T-shaped channel 244 such that a channel 244 is formed on each wall. In an aspect, the T-shaped channels 244 formed on the side walls 230, 232 are disposed adjacent to and form part of the protrusion 240. In an example, each of the T-shaped channels 244 have the same size and shape. The T-shaped channels 244 are sized and shaped so that components (e.g., the frame mount, reel box, nose cone) are more easily coupled to and positioned on the main body 202. For example, as illustrated in FIG. 2, the frame mounts 210 are attached to the T-shaped channel 244 that is positioned on the bottom wall 234. This position enables the rod carrier 200 to be mounted above the frame of the raft. If this location of the rod carrier 200 is not possible on the frame, the frame mounts 210 can mount to the T-shaped channel 244 on one of the side walls 230, 232 so that the rod carrier 200 is on the side of the frame. Additionally, the T-shaped channels 244 enable two or more rod carriers 200 to be coupled together and substantially side-by-side. In this example, two main bodies are coupled to each other and run parallel to each other. These rod carriers can face the same direction or face the opposite directions as required or desired. In examples, a flat plate (e.g., the extension plate 802 shown in FIG. 19) may be used to couple two or more rod carriers 200 side-by-side and with the T-shaped channels 244.

The cross-sectional profile of the extrusion 226 may also include one or more lumens 246 defined within. The lumens 246 may be used to decrease weight and material cost for the extrusions 226. In the example, two lumens 246 are disposed at the bottom wall 234 and on either side of the T-shaped channel 244.

The bracket 228 is used to couple the extrusions 226 along the longitudinal axis. The bracket 228 can have a corresponding U-shape with a bottom having a T-shaped projection 248 that can slidingly engage the T-shaped channel 244 at the bottom wall 234 of the extrusion 226. The sides of the bracket 228 have openings 250 for fasteners (not shown) that also slidingly engage the T-shaped channels 244 of the side walls 230, 232. By slidingly engaging the bracket 228 with the extrusions 226 connection strength is increased while making the assembly easier to assemble. Additionally, positioning the bracket 228 outside the extrusions 226, the bracket 228 does not interfere with the fly fishing rod disposed within the main body 202. The bracket 228 may be an extruded, machined, and/or injection molded component as required or desired.

Figure 5:
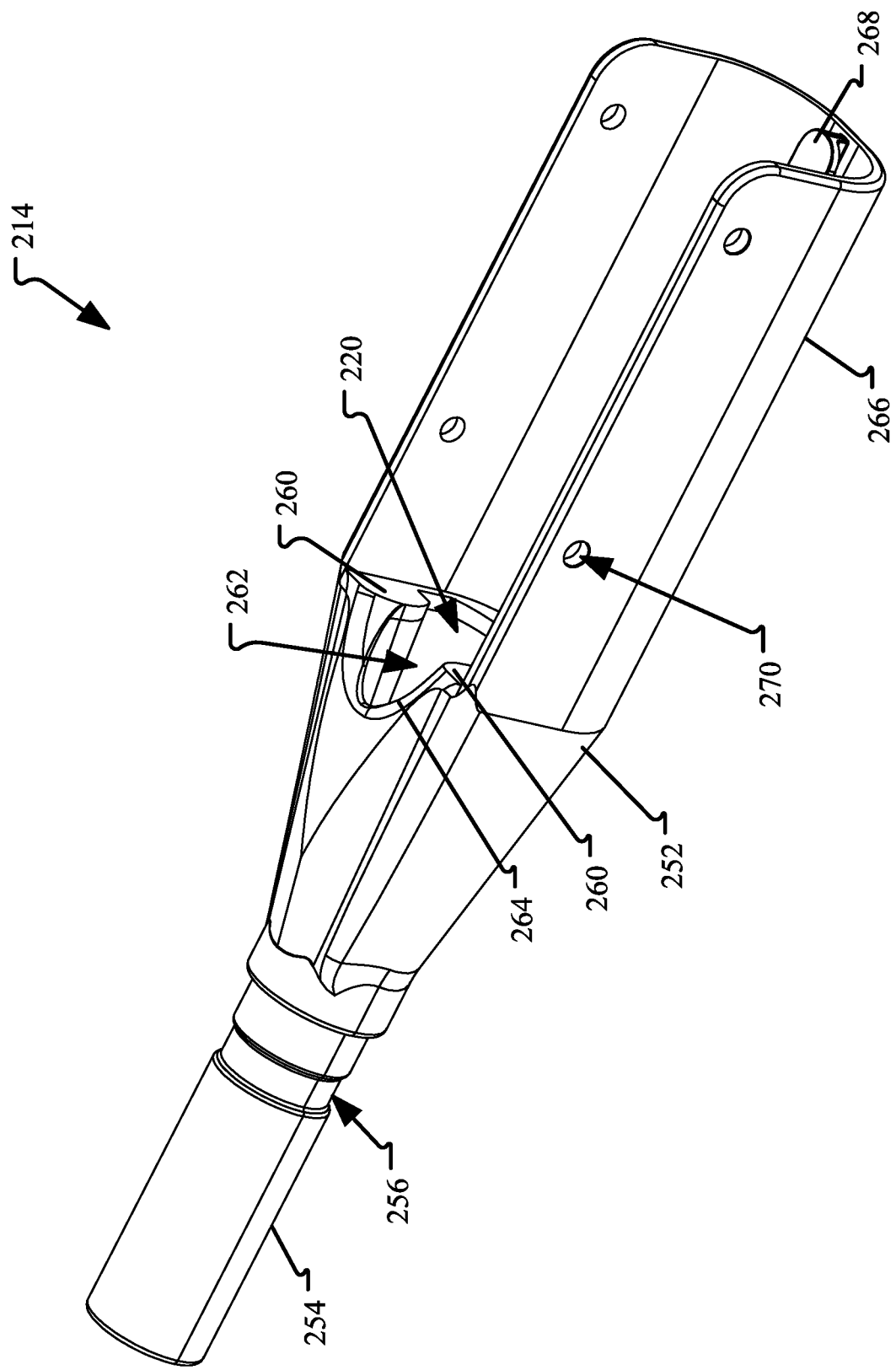
FIG. 5 is a perspective view of a nose cone of the rod carrier.
Figure 6:
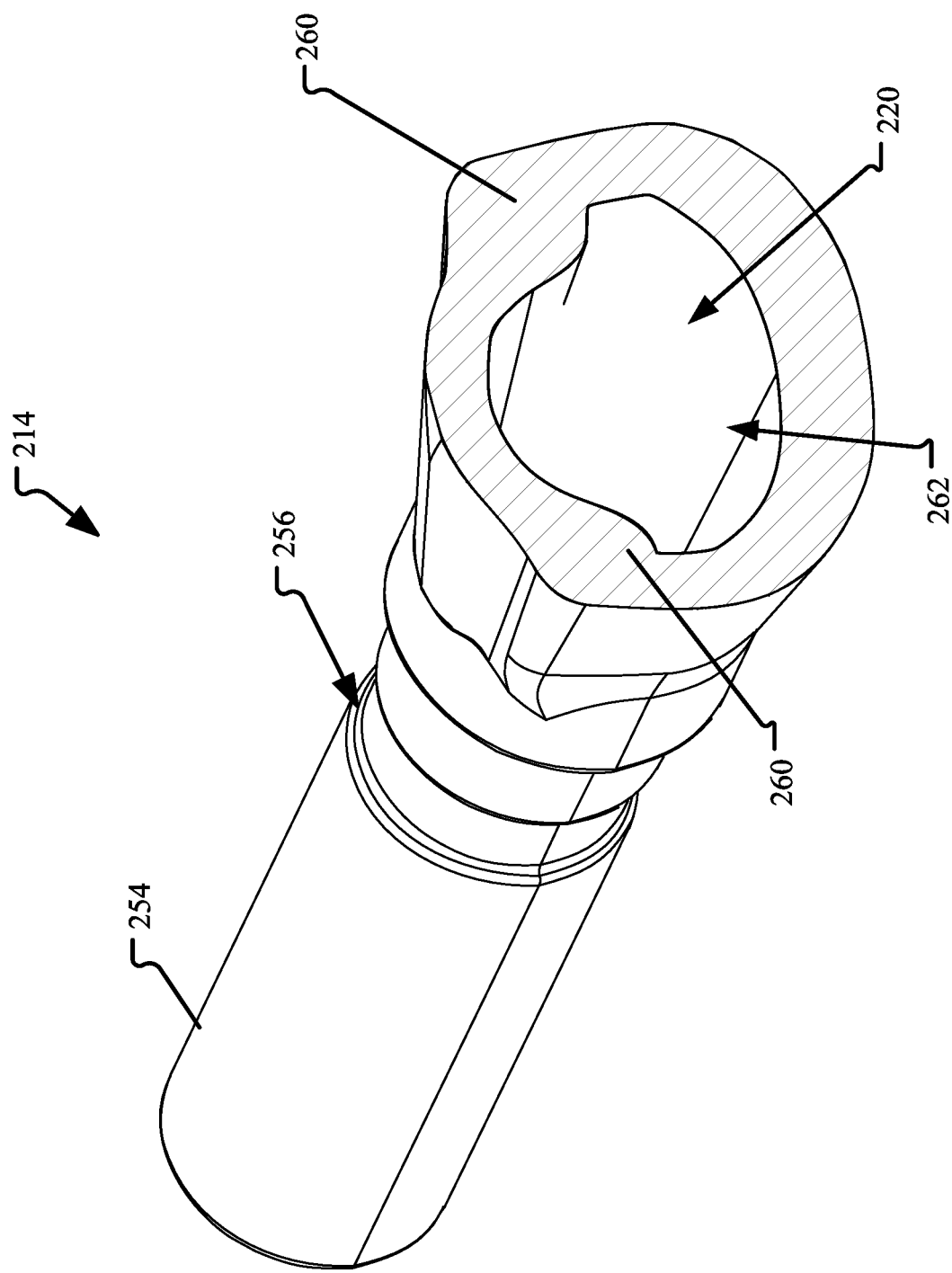
FIG. 6 is a perspective, cross-sectional view of the nose cone.

FIG. 5 is a perspective view of the nose cone 214 of the rod carrier 200 (shown in FIG. 2). FIG. 6 is a perspective, cross-sectional view of the nose cone 214. Referring concurrently to FIGS. 5 and 6, the body of the nose cone 214 includes a first end 252 configured to couple to an end of the main body 202 (shown in FIGS. 3 and 4) and an opposite second end 254 configured to couple to one of the tube members 216, 218 (shown in FIG. 2). The internal passageway 220 is defined between the first and second ends 252, 254 and enclosed by the body. The second end 254 of the nose cone 214 is substantially cylindrical for coupling to the tube members 216, 218. An outer surface of the second end 254 includes an outer annular recess 256 configured to receive a C-clip 258 (shown in FIG. 9) for coupling the tube member to the nose cone 214.

An inner surface of the second end 254 forms a portion of the internal passageway 220 and has a substantially circular cross-sectional profile so as to match the tube members coupled thereto. The first end 252 of the nose cone 214 has a size and shape that corresponds to the U-shaped cross-sectional profile of the main body 202 (shown in FIGS. 3 and 4). The first end 252 includes corresponding protrusions 260 that correspond to the protrusions 240 of the main body 202. The cross-sectional profile of the internal passageway 220 at the first end 252 is larger than the cross-sectional profile of the internal passageway 220 at the second end 254. As such, an inner surface 262 of the internal passageway 220 tapers inwardly from the first end 252 towards the second end 254. Additionally, the inner surface 262 of the internal passageway 220 changes cross-section profiles between the first end 252 and the second end 254. That is, the protrusions 260 reduce in size and shape until the internal passageway 220 becomes substantially circular at the second end 254.

The protrusions 260 are positioned towards the top of the internal passageway 220. By extending the protrusions 260 into the nose cone 214 and smoothly transitioning from a U-shaped profile towards a circular profile, when the distal end of the fly fishing rod is inserted into the rod carrier 200 and slid into the tube members, wear on the fly fishing rod is decreased. For example, from the rod being pushed against orthogonal surfaces relative to the longitudinal axis and which the rod carrier 200 does not have. Additionally, when the distal end of the fly fishing rod is inserted into the nose cone 214, the rod engages underneath the protrusions 260, which then transfers to the protrusions 240 of the main body 202, and so as to secure the fly fishing rod within the rod carrier 200 even with the main body 202 having an open U-shaped profile.

In the example, a top portion of the nose cone 214 proximate the first end 252 may include a notch 264 to assist the user in inserting the distal end of the fly fishing rod into the nose cone 214 and as described herein.

The first end 252 of the nose cone 214 can also include a bracket 266 used to couple the nose cone 214 to the main body 202. In an aspect, the nose cone 214 is of unitary construction. The bracket 266 can have a corresponding U-shape to the main body 202 with a bottom having a T-shaped projection 268 that can slidingly engage the T-shaped channel at the bottom wall of the extrusion. The sides of the bracket 266 have openings 270 for fasteners (not shown) that also slidingly engage the T-shaped channels of the side walls of the extrusion. The nose cone 214 may be an injection molded, cast, or forged component as required or desired.

Figure 7:
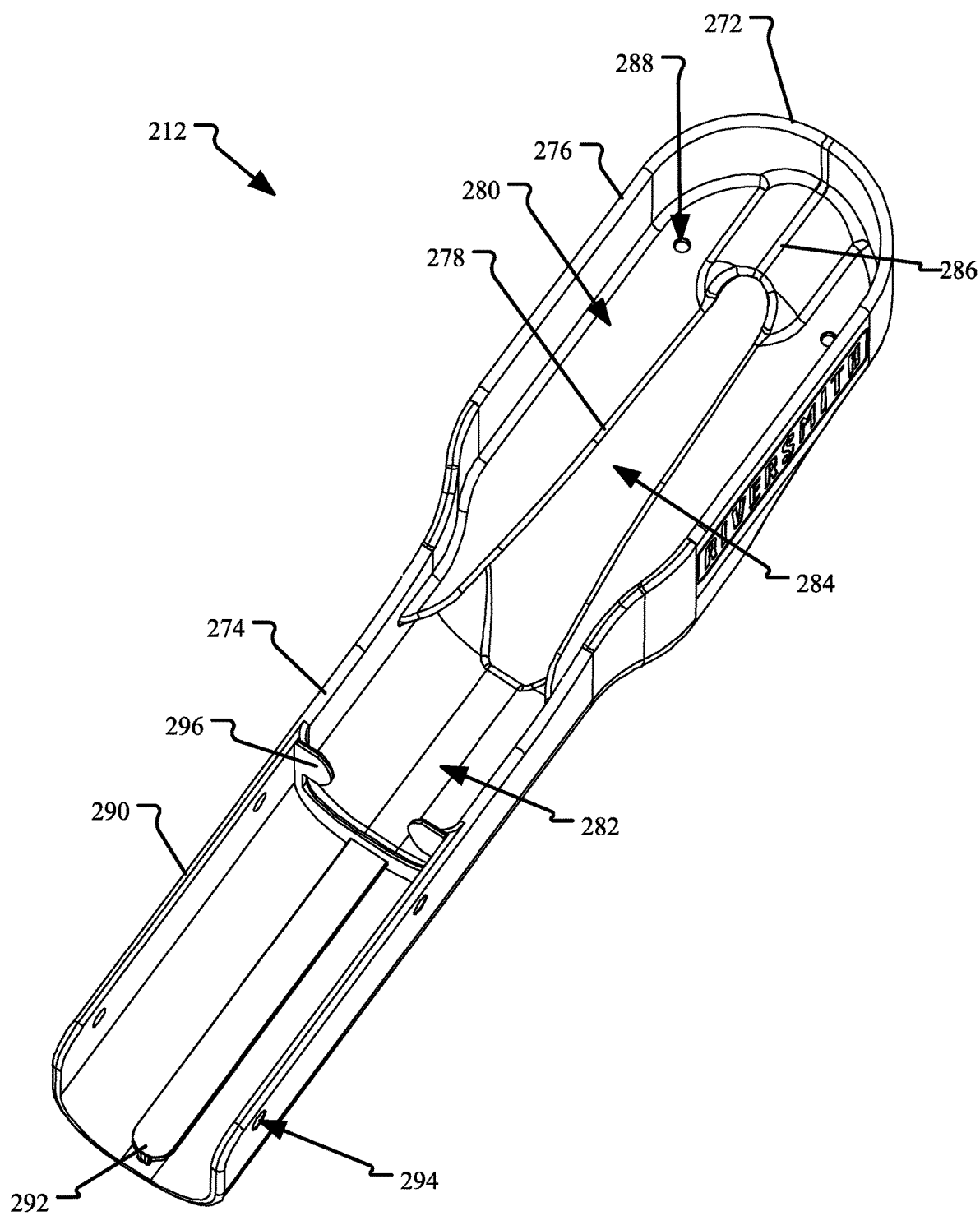
FIG. 7 is a top perspective view of a reel box of the rod carrier.
Figure 8:
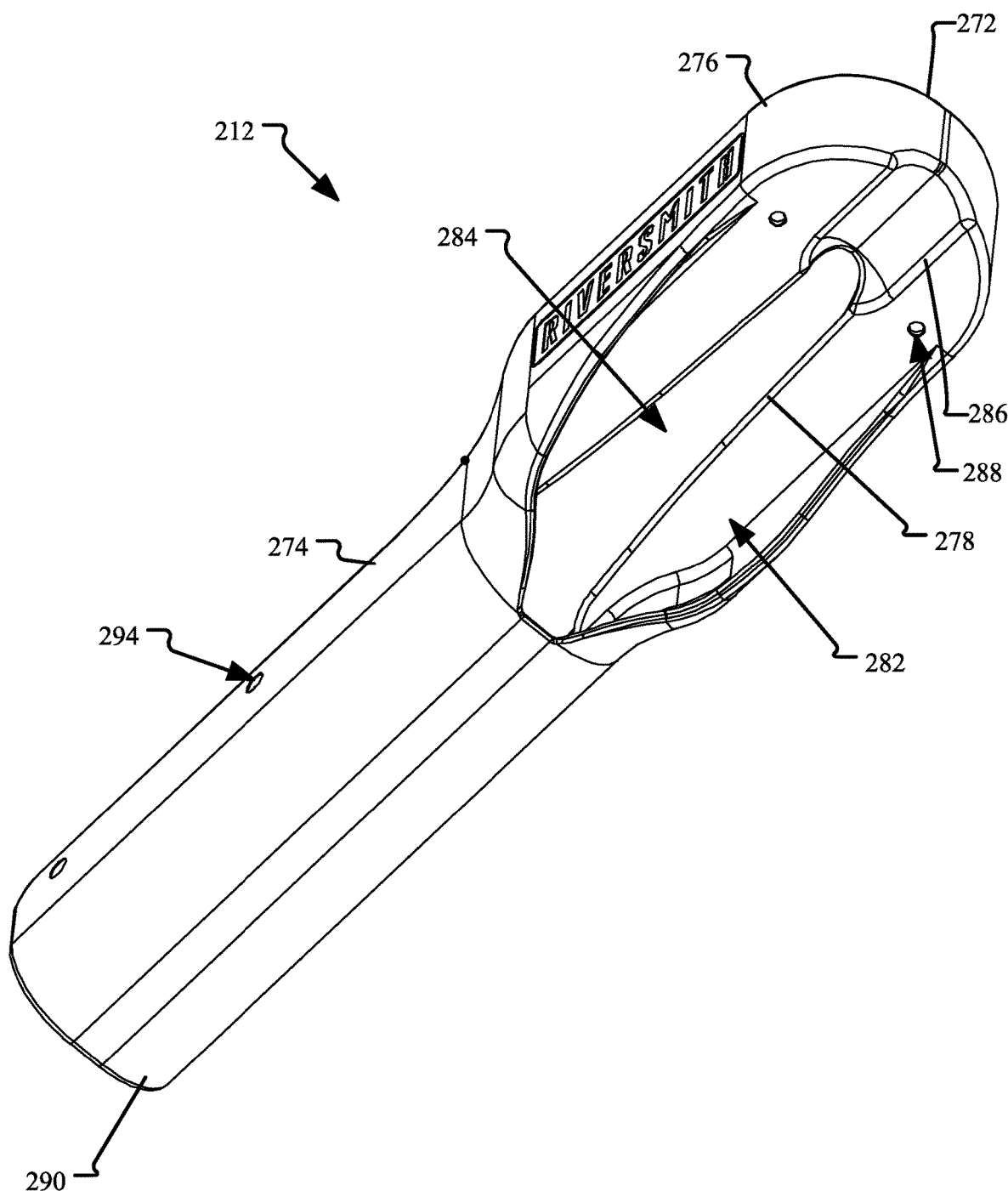
FIG. 8 is a bottom perspective view of the reel box.

FIG. 7 is a top perspective view of the reel box 212 of the rod carrier 200 (shown in FIG. 2). FIG. 8 is a bottom perspective view of the reel box 212. Referring concurrently to FIGS. 7 and 8, the body of the reel box 212 includes a first end 272 configured hold the handle and reel of the fly fishing rod and an opposite second end 274 configured to couple to an end of the main body 202 (shown in FIGS. 3 and 4). The first end 272 has an outer perimeter wall 276 that extends orthogonal to the longitudinal axis. In the example, the outer perimeter wall 276 is substantially U-shaped. A shelf 278 extends inward from the outer perimeter wall 276 and is disposed substantially orthogonal to the outer perimeter wall 276. An upper volume 280 of the reel box 212 is defined above the shelf 278 and a lower volume 282 of the reel box 212 is defined below the shelf 278. The shelf 278 has an opening 284 such that the lower volume 282 is in communication with the upper volume 280.

When the fly fishing rod is received within the reel box 212, the upper volume 280 is configured to receive the reel of the fly fishing rod and the lower volume 282 is configured to receive at least a portion of the handle of the fly fishing rod. This configuration allows the outer perimeter wall 276 to protect the reel while placing the handle underneath at least a portion of the shelf 278 facilitates securing the fly fishing rod in the open top reel box 212. In an aspect, the shelf 278 can include a ridge 286 that extends between the opening 284 and the outer perimeter wall 276. The ridge 286 is sized and shaped to capture at least a portion of the handle of the fly fishing rod underneath. The ridge 286 also allows for different length handles to be accommodated by the reel box 212. Additionally or alternatively, the shelf 278 defines a pair of apertures 288 that are configured to receive a hold down (not shown) for the reel. For example, the hold down may be a bungee strap or the like that can be wrapped at least partially around the reel of the fly fishing rod when disposed within the reel box 212 so as to further secure the reel within the reel box 212.

The second end 274 of the reel box 212 can also include a bracket 290 used to couple the reel box 212 to the main body 202. In an aspect, the reel box 212 is of unitary construction. The bracket 290 can have a corresponding U-shape to the main body 202 with a bottom having a T-shaped projection 292 that can slidingly engage the T-shaped channel at the bottom wall of the extrusion. The sides of the bracket 290 have openings 294 for fasteners (not shown) that also slidingly engage the T-shaped channels of the side walls of the extrusion.

An axial wall 296 can be defined at the second end 274 so as to define the position of the reel box 212 relative to the main body 202. The axial wall 296 has a similar cross-sectional profile to the U-shaped of the main body 202. The axial wall 296 can be spaced apart from the shelf 278.

In some example, the reel box 212 may include a top cover (not shown) so as to further enclose the reel of the fly fishing rod within the reel box 212 for protection. The reel box 212 may be an injection molded, cast, or folded and fabricated sheet metal component as required or desired.

Figure 9:
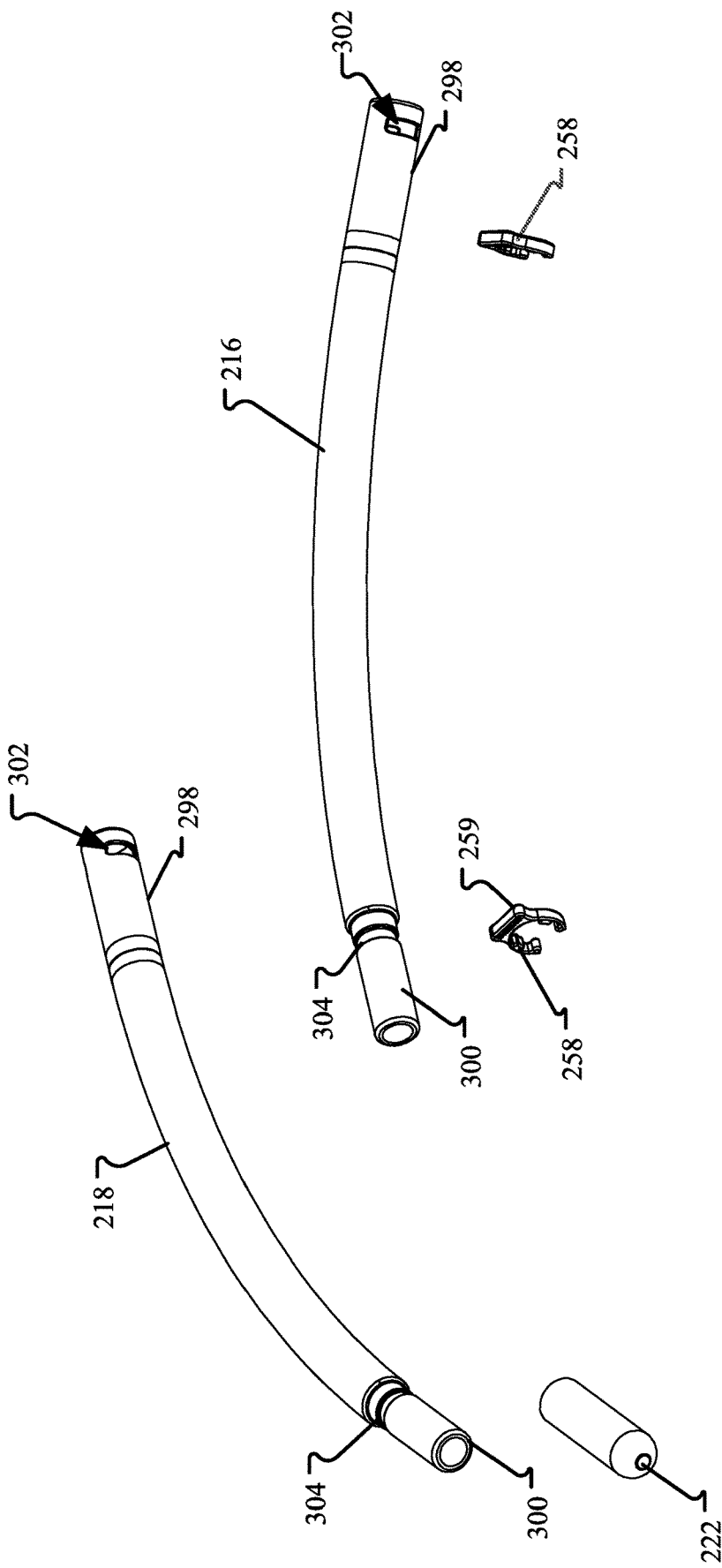
FIG. 9 is an exploded perspective view of tube members of the rod carrier.

FIG. 9 is an exploded, perspective view of the tube members 216, 218 of the rod carrier 200 (shown in FIG. 2). The rod carrier 200 can have any configuration of tube members as described herein and configured for the fly fishing rod being carried therein. For example, a single tube member may be used for shorter fly fishing rods, while two or more tube members may be used for longer fly fishing rods. As illustrated in FIG. 9, each tube member 216, 218 has a first end 298 and an opposite second end 300 that have similar structure. The first end 298 has a pair of circumferential slots 302 defined therein. The second end 300 is of a reduced diameter and includes an outer annular recess 304. To attach the first end 298 of the tube member 216 to the second end 300 of the tube member 218, the circumferential slots 302 are aligned with the outer annular recess 304 and the C-clip 258 is used to couple the tube members 216, 218 together. This connection enables the tube members 216, 218 to rotate relative to each other and so that the tube members 216, 218 can correspond to the shape of the raft. For example, the bow and stern of some rafts raise upward, and the rotation of the tube members 216, 218 enable the shape of the bow and/or stern to be matched. However, axial movement is restricted so that the tube members 216, 218 do not disconnect unless the C-clip 258 is removed. The connection to the tube member 216 to the nose cone 214 (shown in FIGS. 5 and 6) is a similar connection. Because the second ends 300 are of a reduced diameter, the rod carrier 200 includes the cap 222 so as to cover the ends. The C-clip 258 may be an injection molded, cast, forged, and/or machined component as required or desired. As shown in FIG. 9, the C-clip 258 includes a top flange 259 to facilitate handling of the C-clip 258.

In the example, the tube members 216, 218 may be similar and both be curved. In other examples, a tube member may be straight. These tube members can be mixed and matched as required or desired. Examples of different tube member configurations are described below and in reference to FIG. 10. In an aspect, the tube members 216, 218 are substantially rigid. In other aspects, one or more of the tube members may be flexible as required or desired.

Figure 10:
FIG. 10 is a top view of various tube members for use with the rod carrier.
Figure 10:
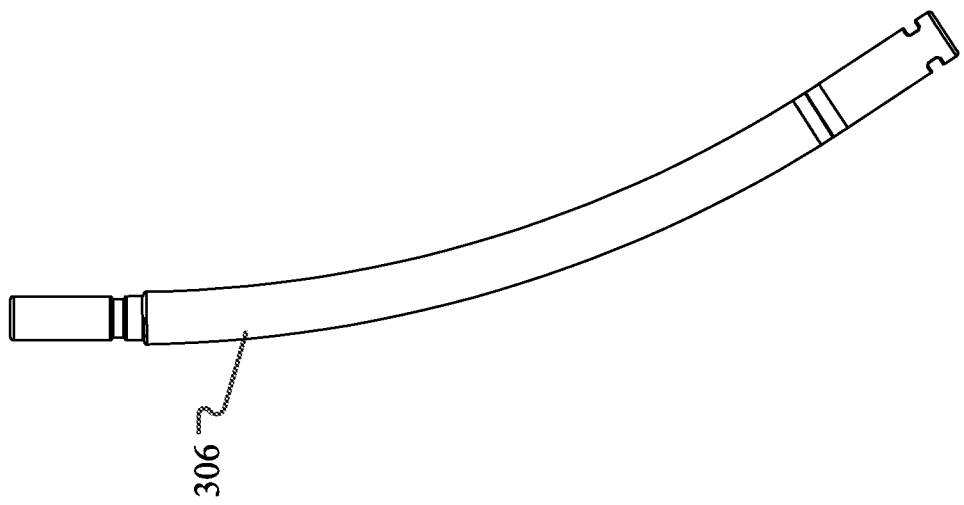

FIG. 10 is a top view of various tube members 306, 308 for use with the rod carrier 200 (shown in FIG. 2). Tube member 306 has a curved shape and may correspond to the tube members 216, 218 described above. Tube member 308 has a straight shape and facilitates carrying a portion of the fly fishing rod and with similar connection features as described herein. In aspects, a length of the straight tube member may be between 6 inches and 36 inches, or more, as required or desired. Based at least partially on the size and shape of the raft and/or fly fishing rod, different combinations of tube members 306, 308 can be used.

In an aspect, the tube member 306 is curved with a radius of about three feet. It has been found that a three feet radius allows the tube member 306 to match the shape and rise of most bows and sterns of the rafts described herein. In other aspects, the radius of the tube member 306 may be less than three feet. In another aspect, the radius of the tube member 306 may be between about 1.5 feet and three feet. Having tube members with different radiuses allows the rod carrier 200 to be configured for a variety of different boats, rafts, and/or vehicles. The tube members 306, 308 may be an extruded, machined, and/or injection molded component as required or desired.

Figure 11:
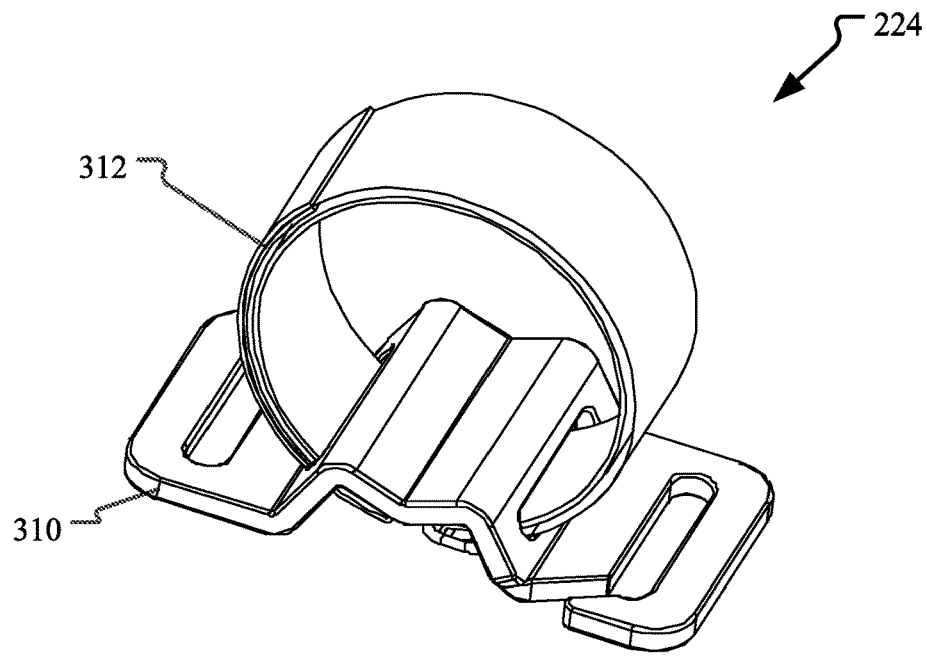
FIG. 11 is a perspective view of a strap for the tube members.

FIG. 11 is a perspective view of the strap 224 for the tube members. The strap 224 includes a mount 310 so that the strap 224 can be secured to the raft and an adjuster 312 that fits around the tube member. By securing at least a portion of the tube members to the raft, the fly fishing rod can be more easily inserted into and removed from the rod carrier 200.

Figure 12:
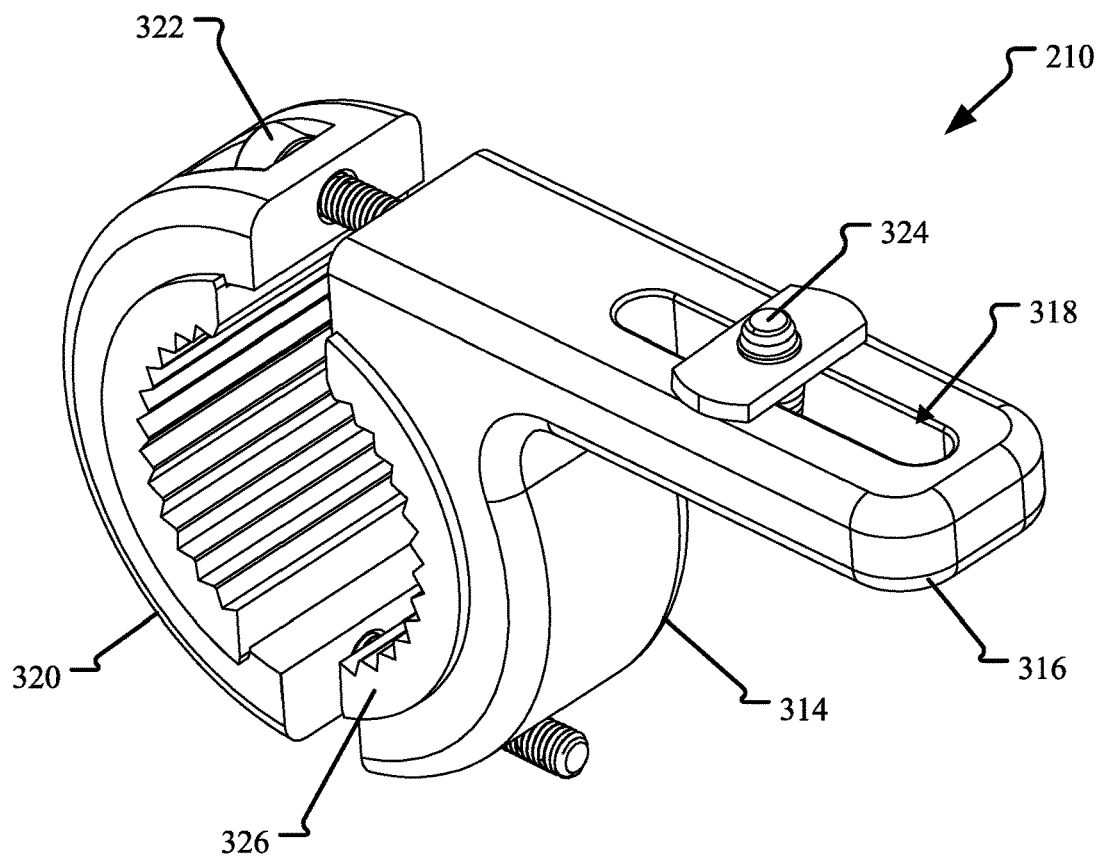
FIG. 12 is a perspective view of a frame mount of the rod carrier.

FIG. 12 is a perspective view of the frame mount 210 of the rod carrier 200 (shown in FIG. 2). The frame mount 210 includes a main body 314 having a flange 316 defining an elongated opening 318. Additionally, the frame mount 210 includes a frame cuff 320. The frame cuff 320 is secured to the main body 314 via one or more fasteners 322 at the top and bottom so that the frame mount 210 can be secured to the frame of the raft. The flange 316 is used so that another fastener 324 (e.g., a bolt with a rectangular nut) can be used to secure to the main body 202 (shown in FIGS. 3 and 4). For example, the rectangular nut is received within the T-channels with the bolt securing the flange thereto. By elongating the flange 316, the frame mount 210 can have different orientations relative to the main body 202 for support. In aspects, the flange 316 may extend from the main body 314 any distance that enables to frame mount 210 to function as described herein. For example, the flange 316 may extend further out from the main body 314 than what is shown in FIG. 12 and as required or desired. In other examples, an extension kit 800 may be used to extend the length of the flange 316. The extension kit 800 is described in reference to FIG. 19 below. The opening 318 may also be extended or be positioned further away from the main body 314. Within the main body 314 and/or the frame cuff 320, a rubber spacer 326 may be included and that facilitates securement of the frame mount 210 to the raft frame.

As illustrated in FIG. 2, the flange 316 aligns with longitudinal axis and is mounted to the bottom wall. In other examples, the flange 316 may be positioned orthogonal to the longitudinal axis and mount to a side wall as required or desired. Because the frame mount 210 is positionable at many different locations on the frame, and the flange 316 can mount to three different walls of the main body 202, the rod carrier 200 can be used with many different frame and raft configurations. Additionally, the frame mount 210 can mount to the side rails of the frame or the cross rails of the frame. The frame mount 210 may be an injection molded, cast, and/or machined component as required or desired.

Figure 13:
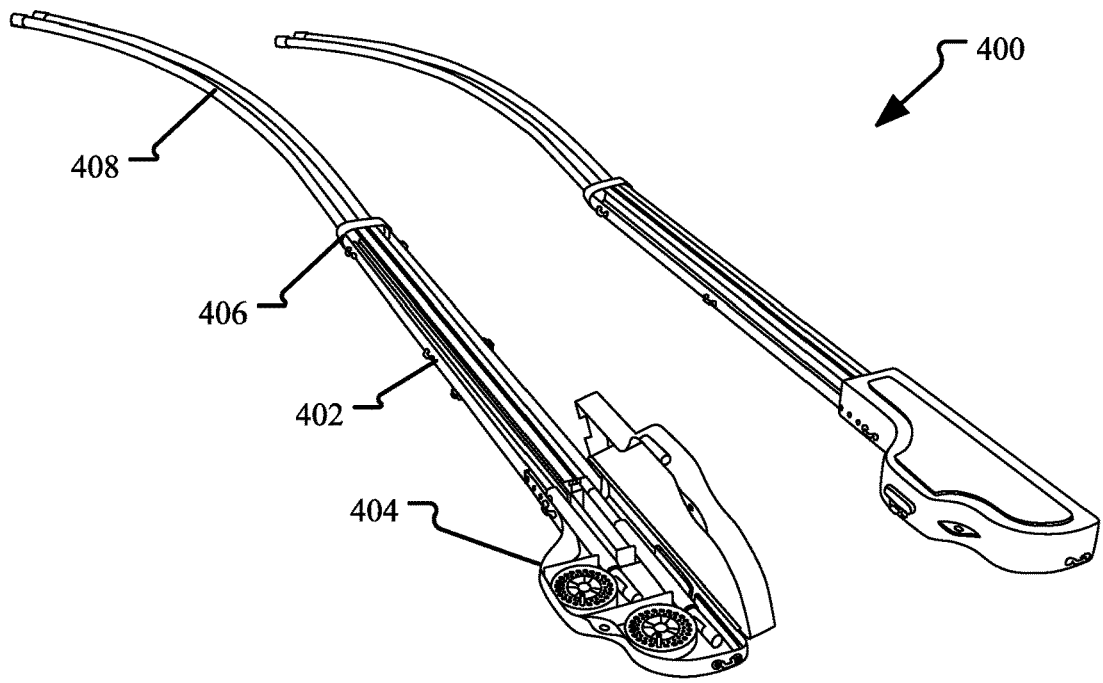
FIGS. 13 and 14 are perspective views of another exemplary rod carrier.
Figure 14:
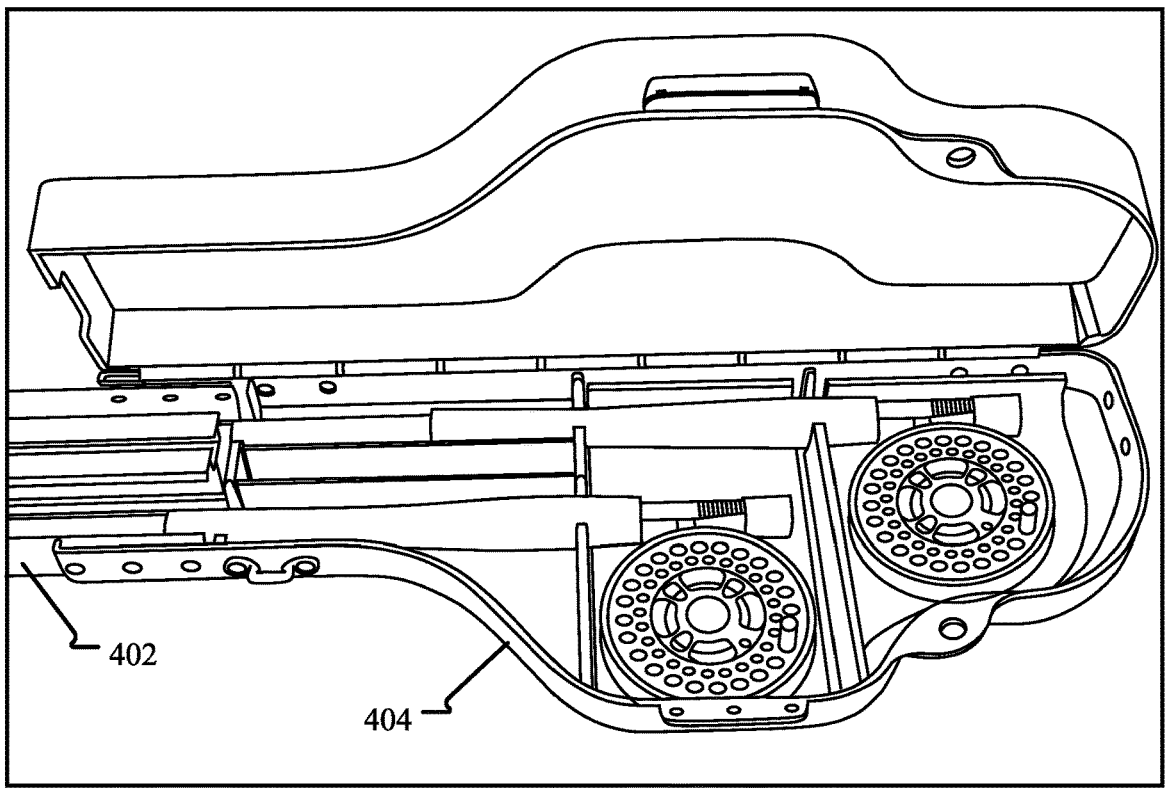

FIGS. 13 and 14 are perspective views of another exemplary rod carrier 400. The rod carrier 400 includes a main body 402, a reel box 404, a nose cone 406, and tube members 408. In this example, the main body 402 may be an extruded component with two interior rod channels and exterior T-shaped channels. In other examples, the main body 402 may only have a single enlarged interior channel. The rod channels in the main body 402 can either be open or enclosed as required or desired. The reel box 404 is shaped and sized to receive two reels and has a cover. The nose cone 406 enables the tube members 408 to couple to the main body 402.

Figure 15:
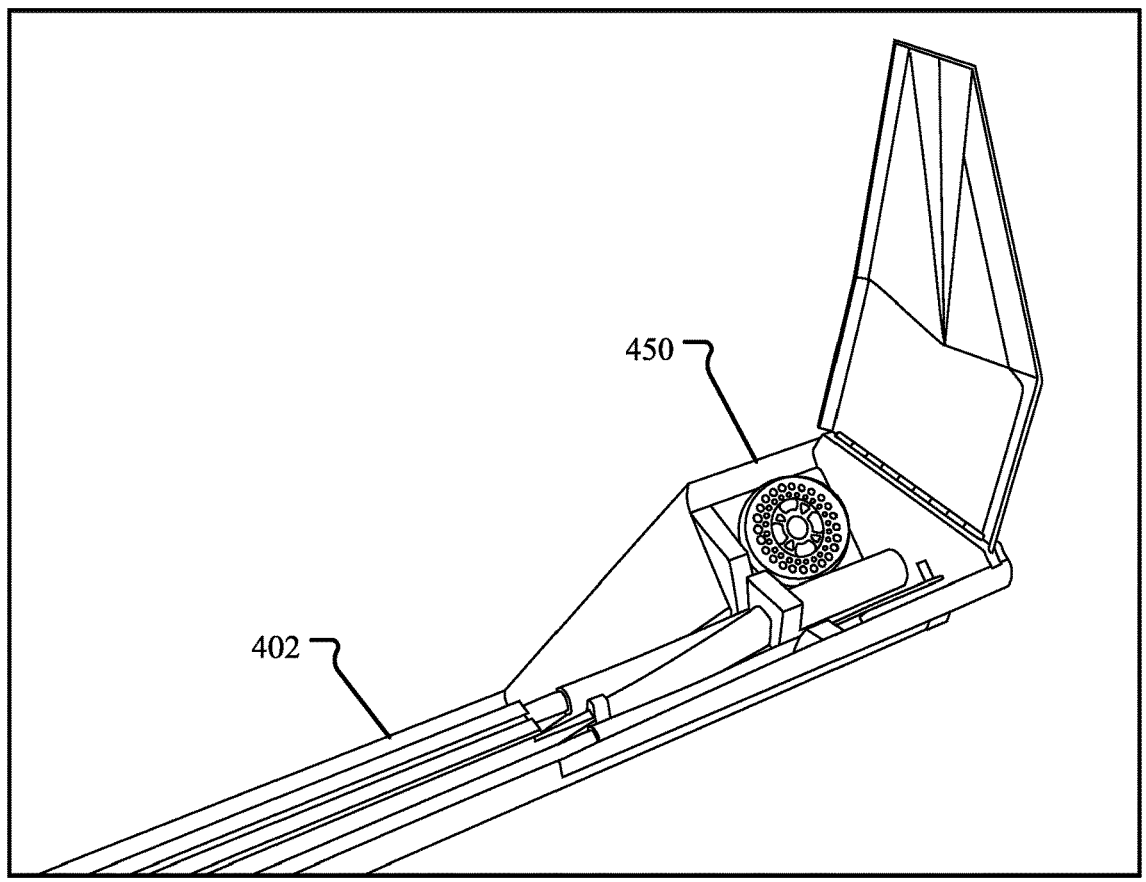
FIG. 15 is a perspective view of another reel box for the rod carrier shown in FIGS. 13 and 14.

FIG. 15 is a perspective view of another reel box 450 for the rod carrier 400 (shown in FIGS. 13 and 14). The reel box 450 couples to the main body 402, and has a reel holder and cover that is different than the reel box 404 shown in FIGS. 13 and 14. The reel box 450 enables the carrier to accommodate two or rods.

Figure 16:
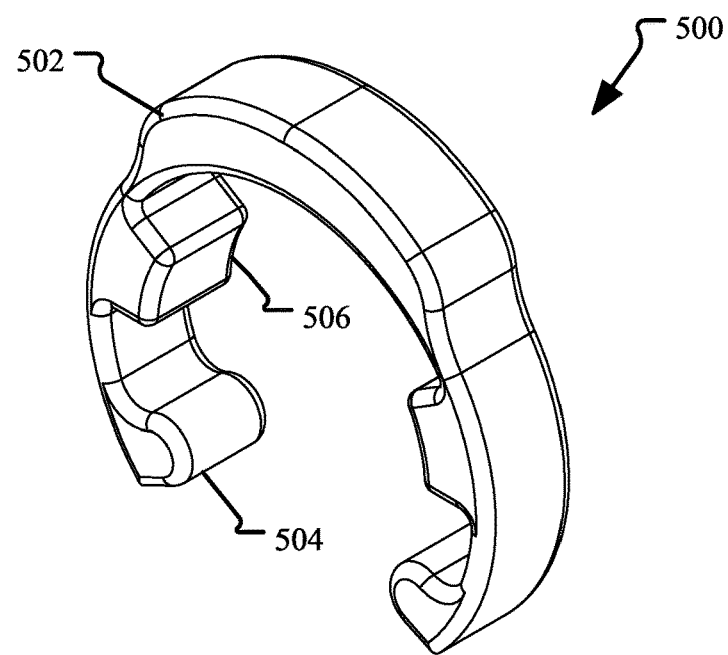
FIG. 16 is a perspective view of a C-clip for use with the rod carrier.

FIG. 16 is a perspective view of a C-clip 500 for use with the rod carrier 200 (shown in FIG. 2). The C-clip 500 functions similar to the C-clip 258 (shown in FIG. 9) and is used to couple the tube members 216, 218 (also shown in FIG. 9) together. In this example, the C-clip 500 includes a top flange 502 that has a smaller height and such that the overall profile of the C-clip is reduced and the flange 502 does not project as far from the tube members 216, 218. This configuration reduces the C-clip 500 from catching on various items, such as, but not limited to, fly rods, leaves and branches, raft components, and the like. Within the interior of the C-clip 500, a pair of lugs 504, 506 are defined and spaced apart from one another. The lugs 504, 506 are spaced apart from one another so that the C-clip 500 can flex around the tube. Additionally, the lugs 504, 506 project radially inward so that the tube members are coupled together while restricting axial movement and allowing rotational movement.

Figure 17:
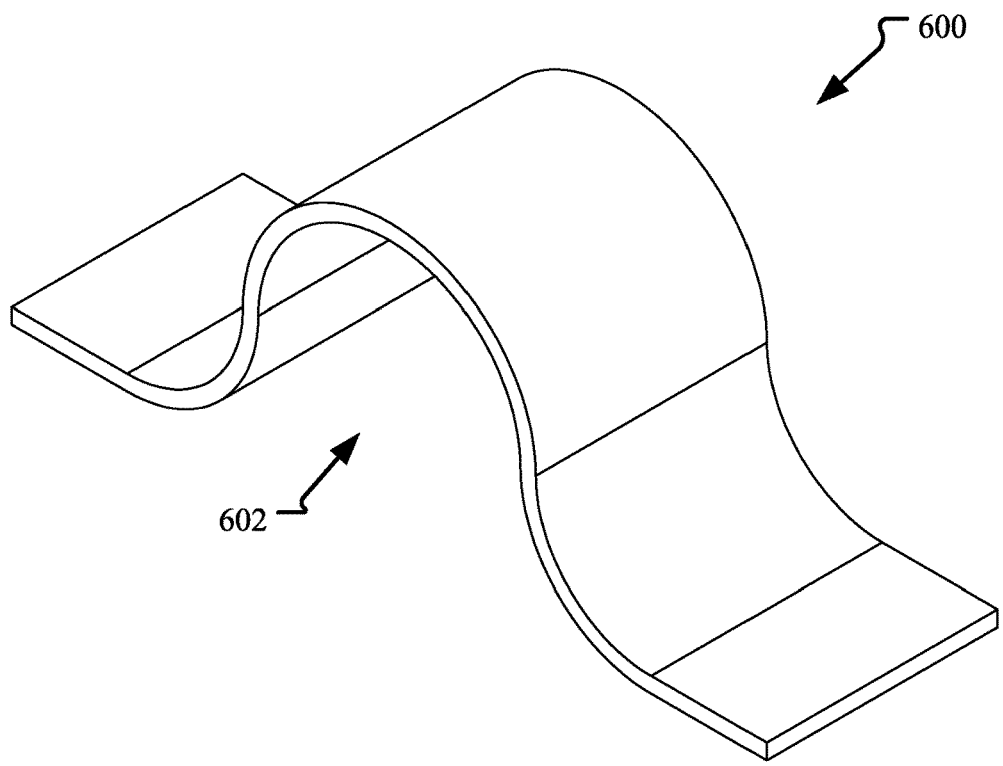
FIG. 17 is a perspective view of another strap for the tube members.

FIG. 17 is a perspective view of another strap 600 for the tube members. The strap 600 is an elongated strip of material with ends that glue or weld to the raft. This creates a pocket 602 for the tube members and so that the tube members are secured to the raft. In examples, the strip of material may be PVC, Hypalon, vinyl, or the like.

Figure 18:
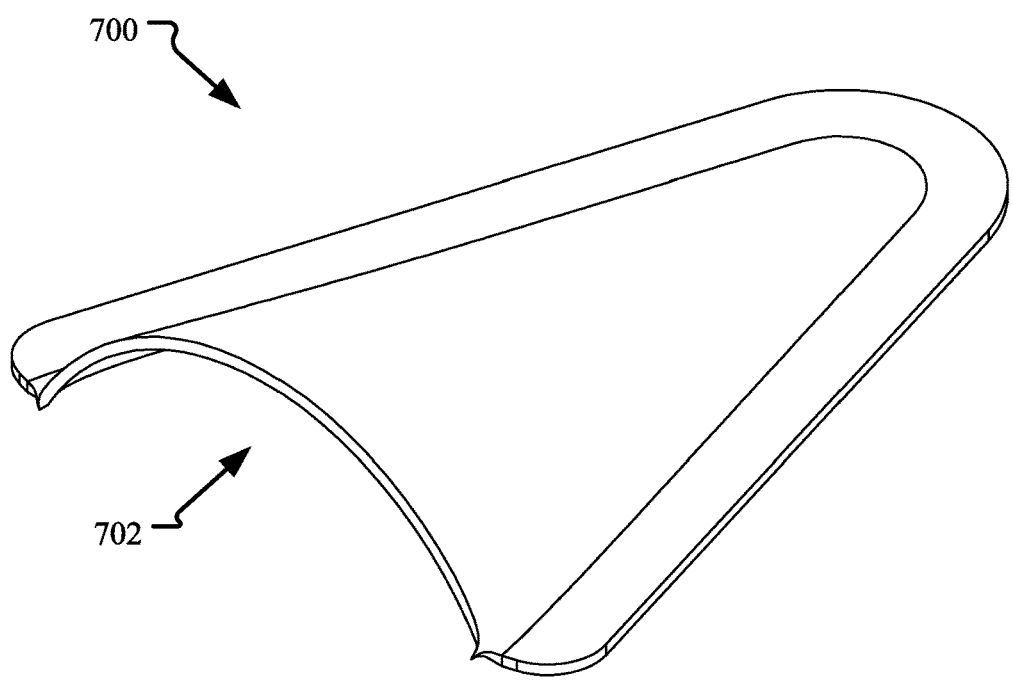
FIG. 18 is a perspective view of a holder for tube members.

FIG. 18 is a perspective view of a holder 700 for tube members. The holder 700 may be a triangular piece of material such as PCT, Hypalon, vinyl, or the like. Two edges of the holder 700 are configured to be glued or welded to the raft, thereby forming a pocket 702 that receives a distal end of the tube members or the cap and so that the ends of the tube members are secured to the raft.

Figure 19:
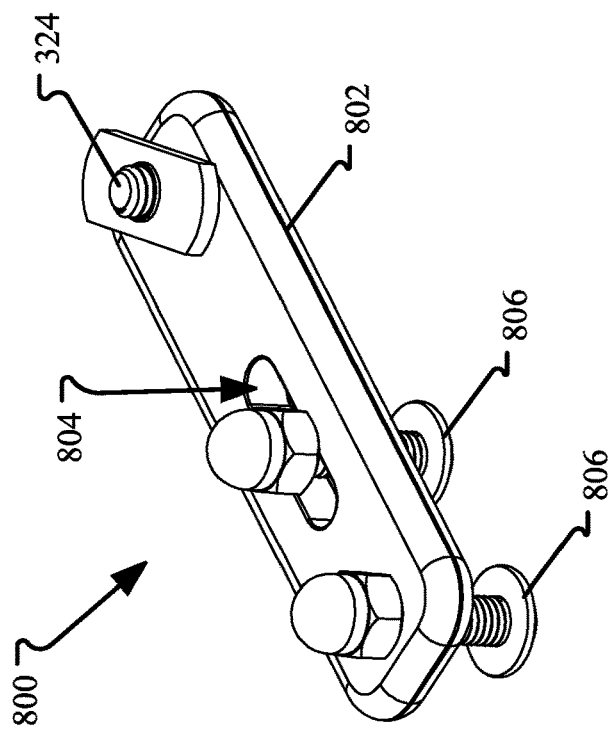
FIG. 19 is a perspective view of the frame mount shown in FIG. 12 with an extension kit.
Figure 19:
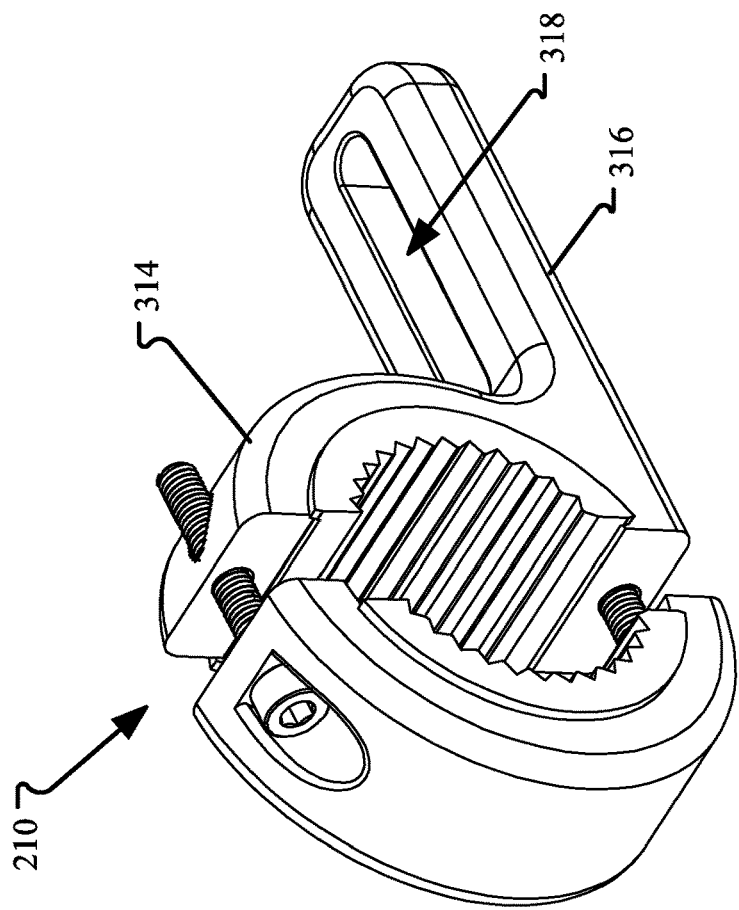

FIG. 19 is a perspective view of the frame mount 210 with the extension kit 800. As described above, the flange 316 may be required or desired to be further elongated so as to position the main body 202 (shown in FIG. 2). In some examples, an alternate main body 314 may be used with an elongated flange compared to what is illustrated. In this example, the extension kit 800 is used to extend the length of the flange 316. The extension kit 800 includes a plate 802 with holes at both ends. Between the holes, an elongated opening 804 is defined. A pair of fasteners 806 (e.g., bolt and nut) are used for one of the end holes and the opening 804 and to couple the plate 802 at the opening 318 of the flange 316. This configuration allows for the plate 802 to extend a variety of distances from the flange 316. The distal end of the plate 802 includes the fastener 324 for coupling the frame mount 210 to the main body 202 as described herein. The plate 802 may additionally or alternatively be used without the frame mount 210 as an independent flat plate for coupling two or more rod carriers side-by-side (e.g., via the fasteners 324 at both ends).

The rod carrier described herein provides an improved fly fishing rod carrier for a boat such as an inflatable raft. The rod carrier itself has a main body with a plurality of channels so that frame mounts can be selectively oriented to best fit the frame configuration of the inflatable raft. For example, the frame mounts can be used to position the main body out of the way of the oar supports on the frame. Additionally, the channels on the main body enable multiple rod carriers to be mounted side-by-side from one another. The main body has a substantially U-shaped cross-sectional profile with protrusions. This configuration enables the fly fishing rod to be easily inserted into and removed from the rod carrier. Additionally, the protrusions capture the fly fishing rod within the main body during transportation. A nose cone is disposed on one end of the main body and has one or more tube members extending therefrom. The nose cone facilitates smooth insertion of the distal end of the fly fishing rod into the tube members for storage. The tube members may be curved and rotatable so that the contour of the raft can be matched. A reel box is disposed on the other end of the main body and is configured to secure and protect the reel of the fly fishing rod while still facilitating easy insertion and removal from the rod carrier.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While various embodiments have been described for purposes of this disclosure, various changes and modifications may readily suggest themselves to those skilled in the art and may be made which are well within the scope of the present disclosure.

What is claimed is:

1. A rod carrier comprising:
    a main body having a first body end and an opposite second body end elongated along a longitudinal axis, the main body having a U-shaped cross-sectional profile with first and second side walls and a bottom wall, an inner surface of the first and second side walls includes a first protrusion spaced apart from the bottom wall and extending a length of the main body, parallel to the longitudinal axis, between the first body end and the second body end;
    a reel box coupled to the first body end of the main body;
    a nose cone coupled to the second body end of the main body, the nose cone having a first nose end and an opposite second nose end, the nose cone defining an internal passageway extending along the longitudinal axis, the first nose end corresponding in shape to the second body end of the main body and including second protrusions positioned towards a top of the internal passageway, the second nose end having a smaller shape than the first nose end, wherein the first protrusions of the main body align with the second protrusions of the first nose end of the nose cone, the second protrusions extending towards the second nose end within the internal passageway and parallel to the longitudinal axis; and
    one or more tube members coupled to the second nose end, at least one of the one or more tube members being curved relative to the longitudinal axis or flexible.

2. The rod carrier of claim 1, wherein the reel box includes an outer perimeter wall at a distal end of the reel box and a shelf disposed substantially orthogonal to the outer perimeter wall, wherein an upper volume of the reel box is defined above the shelf and a lower volume of the reel box is defined below the shelf, the shelf having an opening such that the lower volume is in communication with the upper volume.

3. The rod carrier of claim 2, wherein the shelf includes a ridge extending between the opening and the outer perimeter wall.

4. The rod carrier of claim 1, wherein the one or more tube members include a first tube member having a straight configuration and a second tube member having the curved configuration, the first tube member coupled to the second tube member.

5. The rod carrier of claim 4, wherein the first tube member is coupled to the second tube member via a C-clip such that longitudinal movement is restricted and rotational movement around the longitudinal axis is allowed.

6. The rod carrier of claim 1, wherein the main body has an outer surface, and one or more T-shaped channels are defined within the outer surface and extending between the first body end and the second body end.

7. The rod carrier of claim 1, wherein the at least one of the one or more tube members is curved with a radius of about three feet.

8. The rod carrier of claim 1, wherein the one or more tube members are rotatable around the longitudinal axis when coupled to the second nose end of the nose cone.

9. A rod carrier comprising:
    a main body having a first body end and an opposite second body end elongated along a longitudinal axis, the main body having a U-shaped cross-sectional profile with first and second side walls and a bottom wall;
    a reel box coupled to the first body end of the main body;
    a nose cone coupled to the second body end of the main body, the nose cone having a first nose end and an opposite second nose end, the nose cone defining an internal passageway extending along the longitudinal axis, the first nose end corresponding in shape to the second body end of the main body, the second nose end having a substantially circular cross-sectional profile, wherein the first nose end is larger than the second nose end and an inner surface of the internal passageway tapers inwardly from the first nose end towards the second nose end; and
    one or more tube members coupled to the second nose end, at least one of the one or more tube members being curved relative to the longitudinal axis or flexible, wherein the second nose end of the nose cone includes an outer annular recess, the one or more tube members coupled to the second nose end via a C-clip engaging with the outer annular recess such that longitudinal movement is restricted and rotational movement around the longitudinal axis is allowed.

10. The rod carrier of claim 9, wherein a plurality of T-shaped channels are defined on an outer surface of the main body and extending between the first body end and the second body end, and wherein each of the first and second side walls and the bottom wall includes at least one T-shaped channel.

11. The rod carrier of claim 10, further comprising one or more frame mounts configured to couple to the main body via at least one of the plurality of T-shaped channels.

12. The rod carrier of claim 9, wherein the first and second side walls of the main body include an inner protrusion spaced apart from the bottom wall and extending between the reel box and the nose cone.

13. The rod carrier of claim 9, further comprising a cap coupled to a distal end of the one or more tube members.

14. The rod carrier of claim 9, wherein the reel box defines an upper volume configured to receive a reel of a fly rod and a lower volume configured to receive at least a portion of a handle of the fly rod, the upper volume at least partially separated from the lower volume by a shelf.

15. A rod carrier assembly comprising:
- one or more extrusions couplable together to form a main body, the one or more extrusions being a U-shaped cross-sectional profile with first and second side walls and a bottom wall, an inner surface of the first and second side walls including a protrusion spaced apart from the bottom wall, and each of the first and second side walls and the bottom wall includes at least one T-shaped channel;
- a reel box couplable to an end of the one or more extrusions;
- a nose cone couplable to an end of the one or more extrusions, the nose cone having a first nose end and an opposite second nose end, the nose cone defining an internal passageway, the first nose end corresponding in shape to the cross-sectional profile of the one or more extrusions, the second nose end having a substantially circular cross-sectional profile, wherein the first nose end is larger than the second nose end and an inner surface of the internal passageway tapers inwardly from the first nose end towards the second nose end; and
- one or more tube members couplable to the second body end of the main body.

16. The rod carrier assembly of claim 15, further comprising at least one frame mount selectively positionable within the at least one T-shaped channel and configured to secure the main body to a frame of a raft, the at least one frame mount including an extension plate.

17. The rod carrier assembly of claim 15, further comprising at least one strap for the one or more tube members.

18. The rod carrier assembly of claim 15, wherein the reel box is an open top container with a multi-level bottom surface.

19. The rod carrier assembly of claim 15, wherein the reel box and the nose cone include a bracket configured to engage with the at least one T-shaped channel.

* * * * *